US012738764B2

(12) United States Patent
Thibaut et al.

(10) Patent No.: US 12,738,764 B2
(45) Date of Patent: Sep. 15, 2026

(54) SYSTEMS AND METHODS FOR PROVIDING ELECTRIC POWER TO AN ELECTRONIC DEVICE

(71) Applicant: OVH, Roubaix (FR)

(72) Inventors: Christophe Maurice Thibaut, Noyelles les Seclin (FR); Miroslaw Piotr Klaba, Roubaix (FR)

(73) Assignee: OVH, Roubaix (FR)

( * ) Notice: Subject to any disclaimer, the term of this patent is extended or adjusted under 35 U.S.C. 154(b) by 0 days.

(21) Appl. No.: 18/813,217

(22) Filed: Aug. 23, 2024

(65) Prior Publication Data

US 2025/0079882 A1 Mar. 6, 2025

(30) Foreign Application Priority Data

Aug. 31, 2023 (EP) .................................... 23306445

(51) Int. Cl.

| | |
|---|---|
| ***G06F 1/00*** | (2006.01) |
| ***G06F 11/30*** | (2006.01) |
| ***H02H 3/04*** | (2006.01) |
| ***H02J 9/06*** | (2006.01) |
| *H02J 105/42* | (2026.01) |

(52) U.S. Cl.

CPC ............ *H02J 9/068* (2020.01); *H02H 3/046* (2013.01); *H02J 2105/425* (2026.01)

(58) Field of Classification Search

CPC .... H02J 9/068; H02J 2105/425; H02H 3/046; G06F 1/30; G06F 1/28; G06F 1/3296

See application file for complete search history.

(56) References Cited

U.S. PATENT DOCUMENTS

| | | | | |
|---|---|---|---|---|
| 9,531,285 | B2 * | 12/2016 | Hsiao | H02M 3/33553 |
| 10,833,597 | B2 * | 11/2020 | Wang | H02M 5/2573 |
| 2017/0346335 | A1 * | 11/2017 | Chen | H02J 9/005 |
| 2019/0181862 | A1 | 6/2019 | Flipo et al. | |
| 2020/0019223 | A1 | 1/2020 | Thibaut et al. | |
| 2021/0173470 | A1 * | 6/2021 | Kim | G06F 1/3287 |
| 2021/0376654 | A1 | 12/2021 | Chen | |

FOREIGN PATENT DOCUMENTS

JP H07191078 A 7/1995

OTHER PUBLICATIONS

European Search Report to the counterpart EP Patent Application No. 23306445.0 completed on Jan. 26, 2024.

Office Action with regard to the CN Patent Application No. 2024112105417 mailed Jul. 25, 2026.

* cited by examiner

*Primary Examiner* — Xuxing Chen

(74) *Attorney, Agent, or Firm* — BCF LLP

(57) ABSTRACT

System and method for providing electric power to an electronic device. The method includes receiving electric power at a corresponding voltage, receiving a first standby electric power at a first standby voltage, directing the electric power to the electronic device through a corresponding fuse state indicator selectively connecting a corresponding power input of a monitoring circuit to the electronic device and relying on the first standby electric power to operate, combining the fuse state signal with a signal indicative of a presence of the electric power at the power input of the monitoring circuit to form a main state signal that can be selectively an alive state or a failure state; and, in response to the main state signal being in a failure state, disconnecting the electronic device from the power source.

15 Claims, 8 Drawing Sheets

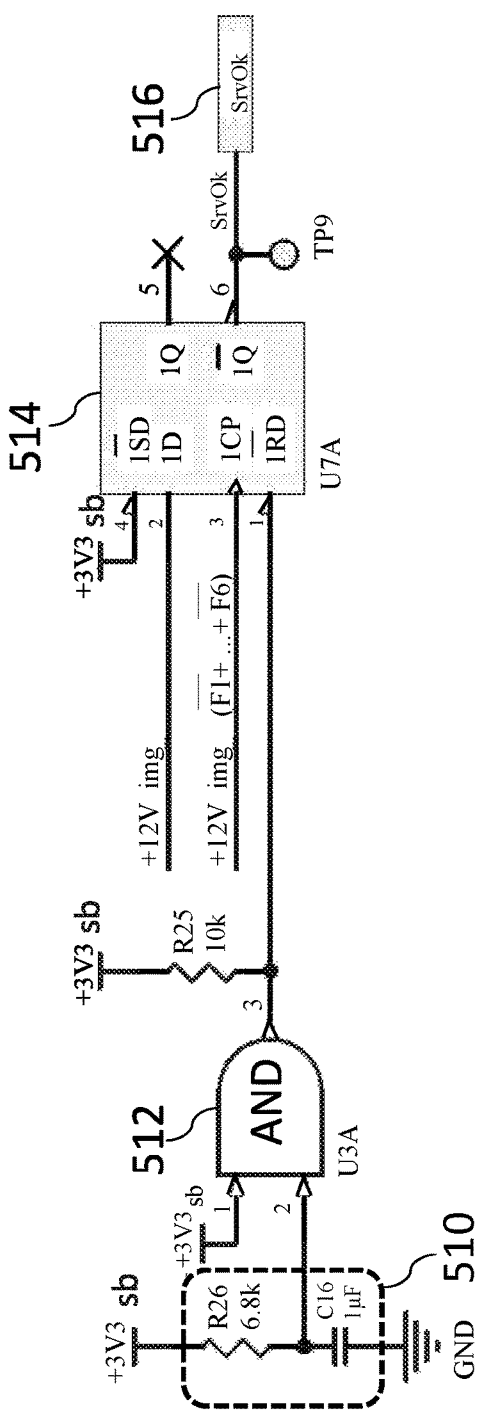
114

SYSTEMS AND METHODS FOR PROVIDING ELECTRIC POWER TO AN ELECTRONIC DEVICE

CROSS-REFERENCE TO RELATED APPLICATION

This application claims priority to European Patent Application No. 23306445.0, filed on Aug. 31, 2023, entitled "SYSTEMS AND METHODS FOR PROVIDING ELECTRIC POWER TO AN ELECTRONIC DEVICE," which is incorporated herein by reference in its entirety.

FIELD

The present technology relates to systems and methods for electric power distribution. In particular, systems and methods for providing electric power to an electronic device through a monitored fuse state indicator are disclosed.

BACKGROUND

A datacenter typically houses tens or hundreds of servers for load sharing and redundancy. Such large-scale server networks consume large amounts of electric power which makes electric power distribution a complex and error-prone task. Any manner of monitoring the power delivery and protecting integrity of the servers and the electric infrastructure of the datacenter is desirable.

Notably, the recent development of liquid cooling technologies to provide cooling to electric equipment has brought additional problematics. For example, a failure of the electric connectivity of the equipment may lead to electric current flowing in the cooling liquid, thereby causing electrolysis thereof. This may put the entire equipment at risk in case of presence of shortcut currents.

Solutions for safe distribution of electric power from a power source to an electronic device with reduced electric current is thus desirable.

SUMMARY

Embodiments and examples of the present technology have been developed based on developers' appreciation of shortcomings associated with the prior art.

In a first broad aspect of the present technology, there is provided a method for method for providing electric power to an electronic device. The method includes receiving, from a power source and at a monitoring circuit electrically connected to the electronic device, electric power at a corresponding voltage, the electric power being received at a corresponding power input of the monitoring circuit, receiving, at a standby power input of the monitoring circuit, a first standby electric power at a first standby voltage, directing, by the monitoring circuit, the electric power to the electronic device through a corresponding fuse state indicator of the monitoring circuit, the fuse state indicator selectively connecting a corresponding power input to the electronic device and relying on the first standby electric power to operate, the fuse state indicator being configured to generate a fuse state signal indicative of a state thereof that can be selectively an alive state or a failure state, combining, by a logic combiner of the monitoring circuit, the fuse state signal with a signal indicative of a presence of the electric power at the power input of the monitoring circuit to form a main state signal that can be selectively an alive state or a failure state and, in response to the main state signal being in a failure state, disconnecting the electronic device from the power source.

Broadly speaking, the monitoring circuit relies on the standby electric power which enables fuse state indicators to operate and monitor a state of fuses once the electronic device is powered. The monitoring circuit may thus enable segregation between circumstances where no electric power is provided to the electronic device, and circumstances where one or more of the fuses are blown.

In some non-limiting implementations, the logic combiner is a first logic combiner, the electric power is a plurality of electric powers, each electric power being received at a corresponding power input of the monitoring circuit. Directing the electric power to the electronic device through a corresponding fuse state indicator of the monitoring circuit includes directing, by the monitoring circuit, the plurality of electric powers to the electronic device through a plurality of corresponding fuse state indicators of the monitoring circuit, each fuse state indicator selectively connecting a corresponding one of the plurality of power inputs to the electronic device and relying on the first standby electric power to operate, each fuse assembly being configured to generate a corresponding fuse state signal. The method further includes, prior to combining the fuse state signal with the electric power, combining, by a second logic combiner of the monitoring circuit, the status signals of the plurality of fuse state indicators to form a combined fuse state signal, the first logic combiner being configured to combine the combined fuse state signal with the plurality of electric powers to obtain the main state signal.

In some non-limiting implementations, the first logic combiner has a first characteristic time during which a main state of the electronic device is set to an alive state upon establishment of the electric connection between the power source and the electronic device, and the second logic combiner has a second characteristic time during which the status of each fuse state indicator is set to an alive state upon establishment of the electric connection between the power source and the electronic device, the second characteristic time being greater than the first characteristic time.

In some non-limiting implementations, the second characteristic time is between 5 and 15 times greater than the first characteristic time.

In some non-limiting implementations, the electronic device is a server of a datacenter, and the power source is electrically connected a power distribution unit for transmitting the electric power to the monitoring circuit.

In some non-limiting implementations, the first standby voltage is 12 Vsb.

In some non-limiting implementations, the method further includes, subsequent to receiving the first standby electric power, converting, by a converting module of the monitoring circuit, the first standby electric power into a second standby electric power.

In some non-limiting implementations, the second standby voltage is 3.3 Vsb.

In some non-limiting implementations, the latch is a D-type latch.

In some non-limiting implementations, the method further includes, in response to the main state signal being in a failure state, operating a latch to maintain a failure state of the main state signal.

In a second broad aspect of the present technology, there is provided a system for providing electric power to an electronic device. The system includes a power input configured to receive an electric power at a corresponding voltage from a power source, a standby power input configured to receive a first standby electric power at a first standby voltage from the power source, a fuse state indicator configured to receive a corresponding electric power from a corresponding power input and output the electric power to the electronic device, the fuse state indicator relying on the first standby electric power to operate, the fuse state indicator being configured to generate a fuse state signal indicative of a state thereof that can be selectively an alive state or a failure state, a logic combiner configured to combine the fuse state signal with a signal indicative of a presence of the electric power at the power input, the logic combiner being configured to generate a main state signal that can be selectively an alive state or a failure state; and a controller. The controller causes, in response to the main state signal being in a failure state, a disconnection of the electronic device from the power source.

In some non-limiting implementations, the controller further causes, in response to the main state signal being in a failure state, a latch to be operated to maintain a failure state of the main state signal.

In some non-limiting implementations, the logic combiner is a first logic combiner. The system further includes a plurality of power inputs, each power input being configured to receive a corresponding electric power at a correspond voltage from the power source, a plurality of fuse state indicator, each fuse state indicator being configured to receive the corresponding electric power from a corresponding one of the power inputs and output the electric power to the electronic device, a second logic combiner configured to combine the status signals of the plurality of fuse state indicators to form a combined fuse state signal, the first logic combiner being configured to combine the combined fuse state signal with the plurality of electric powers to obtain the main state signal.

In some non-limiting implementations, the first logic combiner has a first characteristic time during which a main state of the electronic device is set to an alive state upon establishment of the electric connection between the power source and the electronic device, and the second logic combiner has a second characteristic time during which the status of each fuse state indicator is set to an alive state upon establishment of the electric connection between the power source and the electronic device, the second characteristic time being greater than the first characteristic time.

In some non-limiting implementations, the first standby voltage is 12 Vsb.

In some non-limiting implementations, the system further includes a converting module to convert, subsequent to receiving the first standby electric power, the first standby electric power into a second standby electric power.

In some non-limiting implementations, the second standby voltage is 3.3 Vsb.

In some non-limiting implementations, the latch is a D-type latch.

In some non-limiting implementations, the system is mounted on a support board of the electronic device.

In some non-limiting implementations, the electronic device is a server of a datacenter, and the power source is electrically connected a power distribution unit for transmitting the electric powers to the monitoring circuit In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e. its contents), or it could be a unique document descriptor identifying a data object with respect to a particular object storage device, or some other means of directing the recipient of the indication to a network location, memory address, database table, or other location where the data object may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Embodiments and examples of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represents conceptual views of illustrative circuitry embodying the principles of the present technology. Similarly, it will be appreciated that any flowcharts, flow diagrams, state transition diagrams, pseudo-code, and the like represent various processes that may be substantially represented in non-transitory computer-readable media and so executed by a computer or processor, whether or not such computer or processor is explicitly shown.

The functions of the various elements shown in the figures, including any functional block labeled as a "processor" or "processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some examples of the present technology, the processor may be a general-purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

Additional and/or alternative features, aspects and advantages of embodiments and examples of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 5 is an electric diagram of yet another logic combiner of the monitoring circuit of FIG. 1 in accordance with non-limiting implementations of the present technology;

It should also be noted that, unless otherwise explicitly specified herein, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements that, although not explicitly described or shown herein, nonetheless embody the principles of the present technology.

Furthermore, as an aid to understanding, the following description may describe relatively simplified implementations of the present technology. As persons skilled in the art would understand, various implementations of the present technology may be of a greater complexity.

With these fundamentals in place, we will now consider some non-limiting examples to illustrate various implementations of aspects of the present technology.

Figure 1:
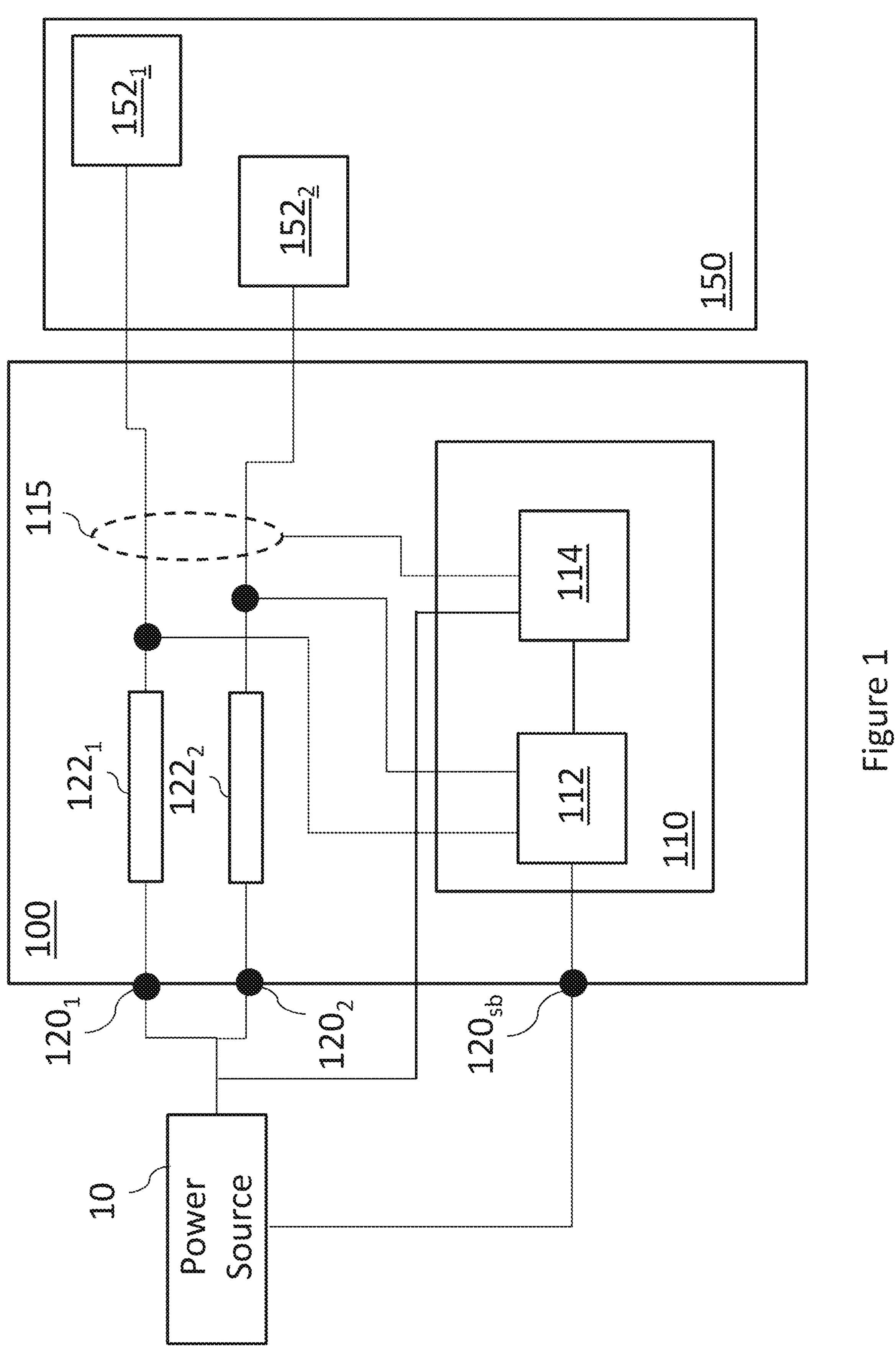
FIG. 1 is a schematic diagram of a monitoring circuit for distributing electric power to a load in accordance with non-limiting implementations of the present technology.

FIG. 1 is a schematic diagram of a monitoring circuit 100 for distributing electric power from a power source 10 to an electronic device 150. The power source 10 may be a power distribution unit (PDU) that provides one or more electric powers at different voltages. For example, the power source 10 may provide a first electric power at 12V, a second electric power at 5V, a third electric power at 3.3V and a fourth electric at 12V standby, or “12 Vsb”.

In this implementation, the electronic device 150 is a server 150 of a datacenter. The load may be any other type of electronic device in alternative implementations of the present technology. The server 150 may be implemented as a conventional computer server. In an example of an embodiment of the present technology, the server 150 may be implemented as a Dell™ PowerEdge™ Server running the Microsoft™ Windows Server™ operating system. Needless to say, the server 150 may be implemented in any other suitable hardware, software, and/or firmware, or a combination thereof. The server 150 may be provided with air cooling equipment, water cooling equipment or any other suitable cooling equipment that provides cooling to the electronic components of the server 150.

The monitoring circuit 100 includes a plurality of power inputs $\mathbf{120}_1$, $\mathbf{120}_2$ (two of them being depicted on FIG. 1) and directs the electric power to electronic components $\mathbf{152}_1$, $\mathbf{152}_2$ of the server 150. To do so, the monitoring circuit includes a local controller 110 and a plurality of fuse state indicators $\mathbf{122}_1$, $\mathbf{122}_2$ communicably connected therewith. In some embodiments, the monitoring circuit 100 includes eight (8) power inputs and eight (8) corresponding fuse state indicators. Only two of each are depicted for simplicity of FIG. 1. It should be noted that two or more power inputs 120 may receive a same electric power (e.g. 12V) from the power source 10. Some of the fuse state indicators may not be electrically connected to electric components of the server 150 and be used to assess if the power source provides the required electric powers.

Broadly speaking, each fuse state indicator 122 includes a fuse whose state can be either an “alive” state or a “failure” state. The state of the fuse of each fuse state indicators 122 is actively monitored by the local controller which may, in response to a fuse being in a failure state, disconnect the server 150 from the power source 10 to prevent any additional damages from occurring to the server 150 and/or the power source 10 and other equipment electrically connected therewith. In the event of a short circuit on another server electrically connected to the power source 10, it may be important that the power source 10 is not overloaded and can continue to supply power to the other servers (i.e. to avoid propagation of the failure).

In opposition to some other technologies relying on fuses, the monitoring circuit 100 may actively detect which fuse is in a failure state. Said other technologies usually measure a voltage at an output of a fuse to detect a state thereof. However, there still may be confusion about, in case where no voltage is measured at the output of the fuse, whether the fuse is in a failure state, or if there is no electric power flowing there through. In both cases, this may generate an infinite reaction loop that inhibits the flow of electric current to the load to be powered through the fuse.

The monitoring circuit further receives, from the power source 10, a standby electric power at a standby power input $\mathbf{120}_{sb}$. As will be described in greater details herein after, the standby electric power is used to enable to local controller 110 to monitor the fuse state indicators $\mathbf{122}_1$, $\mathbf{122}_2$. In this implementation, the standby electric power is $12V_{sb}$ but this aspect is not limitative.

Figure 2:
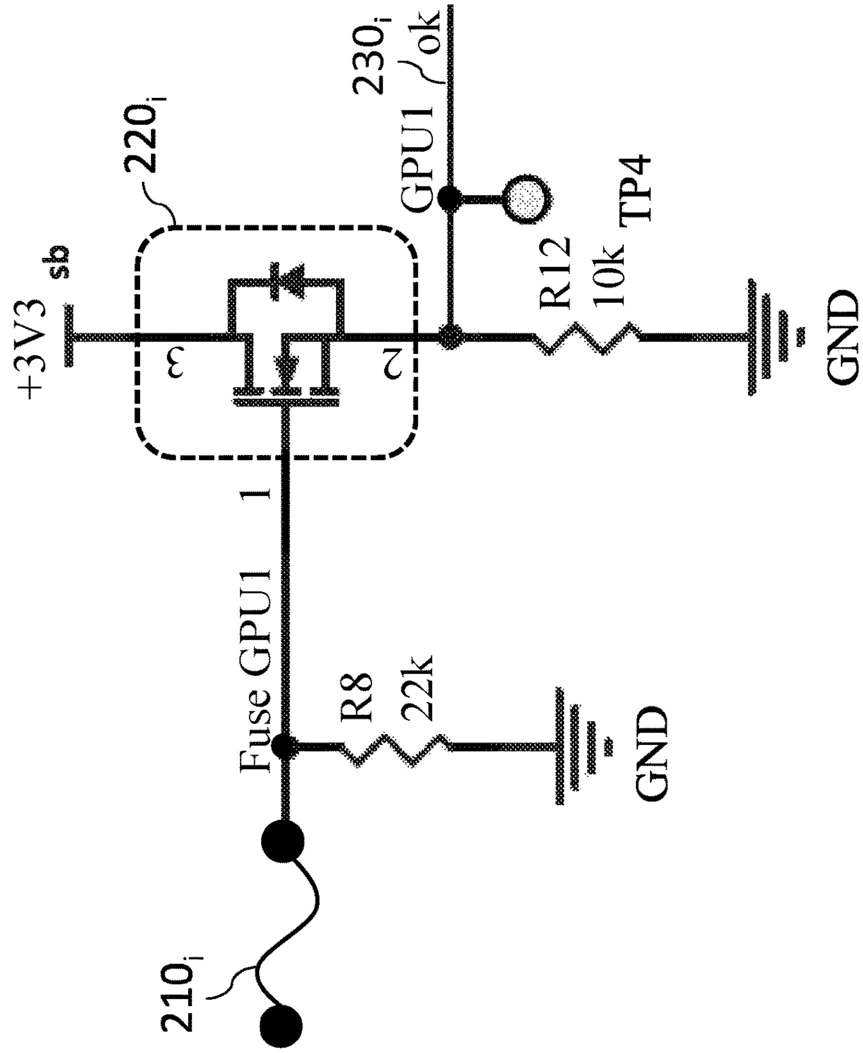
FIG. 2 is an electric diagram of a fuse state indicator of the monitoring circuit of FIG. 1 in accordance with non-limiting implementations of the present technology.

FIG. 2 is an electric diagram of a fuse state indicator $\mathbf{122}_i$ of the monitoring circuit 100 of FIG. 1 in accordance with non-limiting implementations of the present technology. The fuse state indicator $\mathbf{122}_i$ includes a fuse $\mathbf{210}_i$ electrically connected to a metal-oxide-semiconductor field-effect transistor (MOSFET) $\mathbf{220}_i$ used as an electric switching device.

More specifically, the MOSFET $\mathbf{220}_i$ is electrically connected to the fuse $\mathbf{210}_i$ at input 1 and a $3V3_{sb}$ inlet at input 3. In this implementation, the monitoring circuit includes a voltage converter to convert a voltage of the standby electric power of $12V_{sb}$ into a $3.3V_{sb}$ standby electric power. This aspect is not limitative, other voltage values may be used for the standby electric powers used by the monitoring circuit 100.

In use, the MOSFET $\mathbf{220}_i$ generate an output signal $\mathbf{230}_i$ indicative of a state of the fuse $\mathbf{210}_i$, or “status signal” $\mathbf{230}_i$. More specifically, the status signal $\mathbf{230}_i$ is $3V3_{sb}$ in case where the fuse $\mathbf{210}_i$ is blown or at a pre-determined value based on the electric power received at the power input $\mathbf{120}_i$ corresponding to the fuse state indicator $\mathbf{122}_i$. As such, the MOSFET $\mathbf{220}_i$ rely on the standby electric power to provide the status signal $\mathbf{230}_i$ indicative of the state of the fuse $\mathbf{210}_i$.

Figure 3:
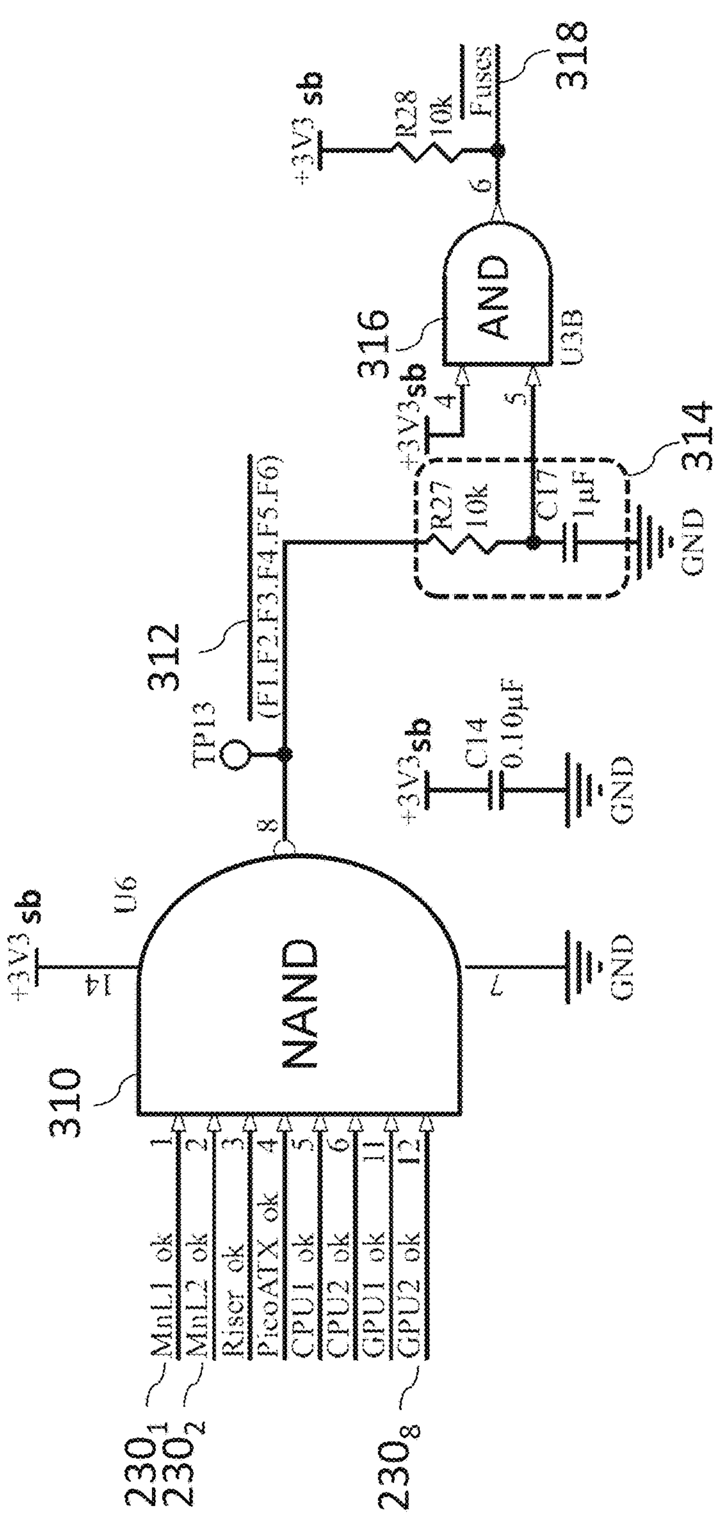
FIG. 3 is an electric diagram of a logic combiner of the monitoring circuit of FIG. 1 in accordance with non-limiting implementations of the present technology.

FIG. 3 is an electric diagram of the logic combiner 112 of the monitoring circuit 100 in accordance with non-limiting implementations of the present technology. The logic combiner 112 receives status signals from each of the fuse states indicators and includes an NAND gate 310 for combining output signals thereof. In use, the gate 310 is electrically connected to the Ground (GND) and to a $3.3V_{sb}$ inlet to operate. The gate 310 thus generates a signal 312 from the status signals.

In some implementations, the logic combiner 112 further includes a resistor-capacitor circuit (RC circuit) 314 including a resistor R27 and a capacitor C17, and another AND gate 316 receiving the signal 312 through the RC circuit 314 and a $3.3V_{sb}$ inlet. In use, the gate 316 generates a combined fuse state signal 318 denoted $\overline{\text{Fuses}}$. As will be described in greater details herein after, the RC circuit 314 may disable or delay a generation of the combined fuse state signal 318 during a loading time of the capacitor C17 upon establishment of the electric connection between the power source 10 and the server 150.

Figure 4:
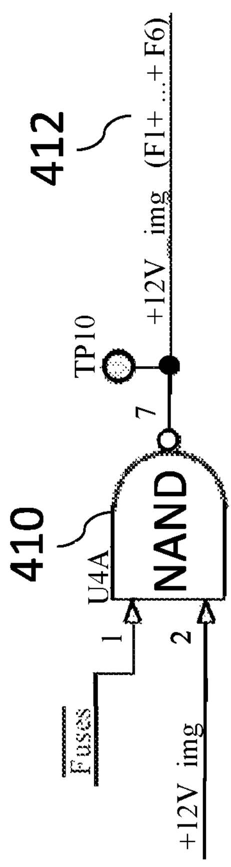
FIG. 4 is an electric diagram of logical gates of the monitoring circuit of FIG. 1 in accordance with non-limiting implementations of the present technology.

FIG. 4 is an electric diagram of a logical gate of the logic combiner 112 in accordance with non-limiting implementations of the present technology. In these implementations, the logic combiner 112 includes a NAND gate 410 that receives the combined fuse state signal 318 and a status signal of a fuse state indicator that indicates the presence of a 12V electric power at a power input of the monitoring circuit 100. The voltage value (i.e. 12V) of the electric power is not limitative. One of the functions of the gate 410 is to check that all the fuses 210 are not blown and a presence of the 12V electric power that may be used to power some of the electronic components 152 of the server 150. In other words, the status signal “12V img” is a status signal generated by one of the fuse state indicators. In some implementations, the status signal "12V img" is 12V in cases where the fuse of said fuse state indicator is not blown, and 3.3V in cases where the fuse is blown. The gate 410 thus generates an adjusted combined fuse state signal 412.

FIG. 5 is an electric diagram of the logic combiner 114 of the monitoring circuit 100 in accordance with non-limiting implementations of the present technology. The logic combiner 114 includes a latch 514. In this implementation, the latch 514 is a D-latch that receives the adjusted combined fuse state signal 412 from the gate 410 as a Clock Pulse (CP) input (see input 3), and the status signal "12V img" as a Data (D) input. Therefore, the output signal of the gate 410 is used to trigger a latching of the status signal "12V img" into the latch. The logic combiner 114 also includes a RC circuit 510 combined with an AND gate 512 to generate a Read Enable (RD) input for the latch 514. Therefore, the RC circuit 510 and the gate 512 are used to generate control signal that enables or disables the reading of data into the latch 514. The latch 514 also receives a $3.3V_{sb}$ signal as a Set-Disable" input that serves as a control signal to set or rest the latch 514.

Broadly speaking, the logic combiner 114 combines the adjusted combined fuse state signal 412 with a signal indicative of a presence of the electric power at the power input of the monitoring circuit to form a main state signal 516 "srvOk" that can be selectively an alive state (i.e. high state) or a failure state (i.e. low state). Referring back to FIG. 1, the monitoring circuit 100 further includes a switching mechanism 115 that can disconnect the server 150 from the power source 10 in case of the srvOk signal being in the failure state (i.e. detection of a failure of one of the fuse 210). For example, the switching mechanism 115 may include a plurality of switches that can be actuated in parallel to disconnect the server 150 from the power source 10.

In some implementations, the srvOK signal must be high for the monitoring circuit 100 to distribute electric power from the power source to the server 150. In the event of a fault, (e.g. an open fuse 210), the srvOK signal must switch to the low state. However, when the server 150 is electrically connected to the monitoring circuit 100 and the power source 10, as the monitoring circuit 100 is not powered, the srvOK signal can only be in the low state, which may cause issues (e.g. blocking reception of the power supply from the power source 10) during insertion of the server 150.

The latch 514 is used to force the srvOK signal in the high state for a short time denoted $T_1$ using the RC circuit 510 at the RD input thereof, so that the inserted server 150 can receive electric power and start up. Therefore, when the server 150 is inserted, the monitoring circuit 100 is supplied with the $12V_{sb}$ standby electric power which enables the fuse state indicators 122 to operate and monitor a state of the fuses 210.

In this embodiment, the detection of the state of the fuses 210 is delayed by a time T2 with T2>T1 to ensure that in the event of an insertion failure at the server 150, said detection is correctly executed and is not altered by the state of the latch 514. It can be said that the latch 514 acts as a memory and stores the detection state to indicate failure of a fuse 210.

Figure 6:
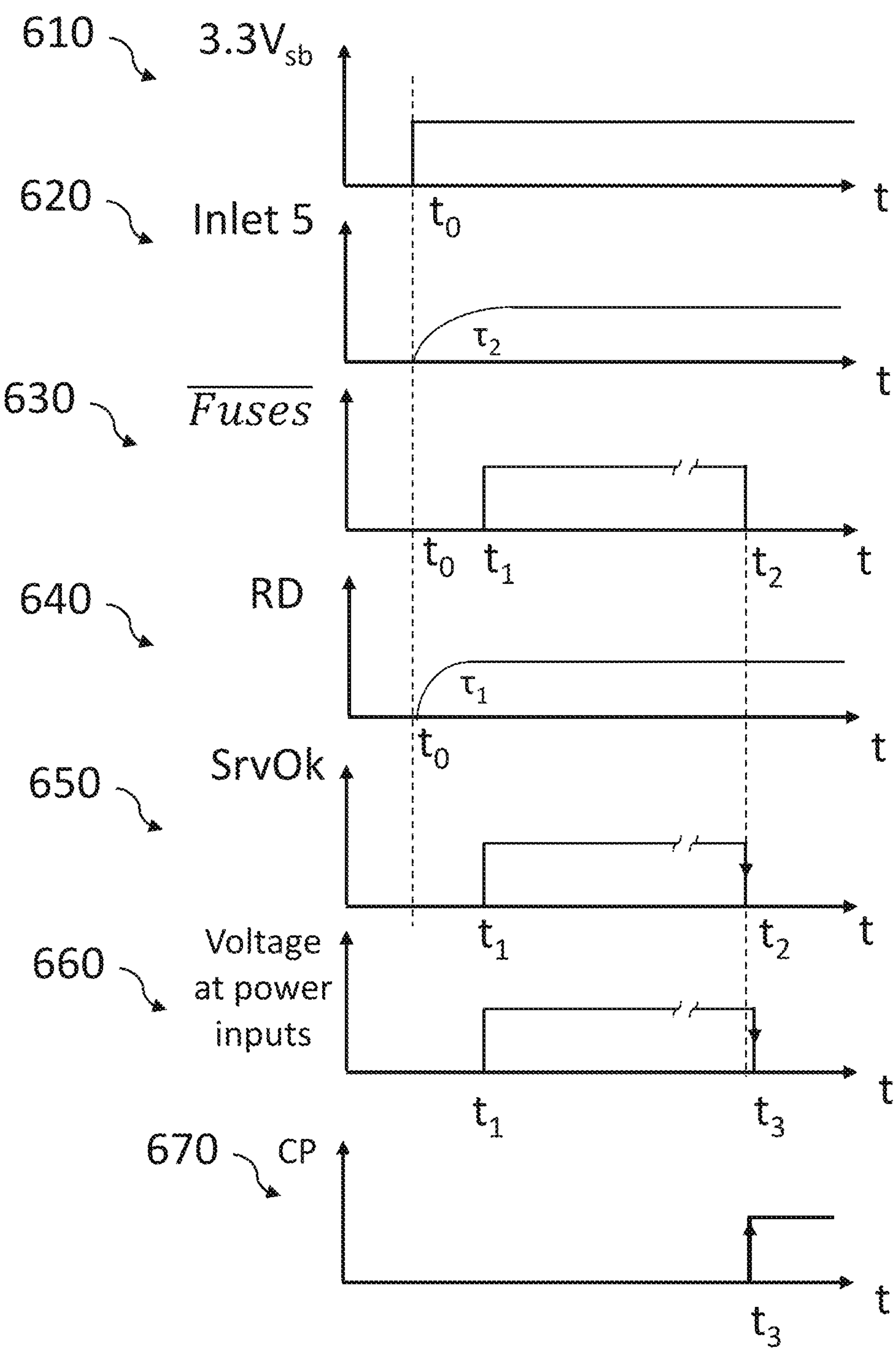
FIG. 6 shows temporal charts of signals processed by the monitoring circuit of FIG. 1 in accordance with non-limiting implementations of the present technology.

FIG. 6 shows temporal charts of voltages of signals processed by the monitoring circuit 100 in accordance with non-limiting implementations of the present technology.

Chart 610 shows a temporal evolution of the $3.3V_{sb}$ used to operate the components of the monitoring circuit 100 such as the logic combiners 112, 114. In the illustrative example of FIG. 6, the monitoring circuit 100 is electrically connected to the power source 10 at $t=t_0$. The power source 10 thus provides the standby electric power $12V_{sb}$ at $t=t_0$ such that the $3.3V_{sb}$ signal rises at that time.

Chart 620 shows a temporal evolution of the voltage at inlet 5 of the gate 316 of the logic combiner 112 (i.e. an output of the RC circuit 314). A characteristic time of the RC circuit 314 is noted $\tau_1$. In this illustrative example, $\tau_1$ is about 10 ms. It can be said that the RC circuit 314 thus delays an establishment of the output of the gate 316. As a result, the "$\overline{\text{Fuses}}$" signal is delayed and rises at $t=t_1$ as shown on chart 630, which in turn causes the srvOk signal to rise at $t=t_1$.

In response to the electrical connection of the monitoring circuit 100 to the power source 10 at $t=t_0$, the inlet 2 of the gate 512 of the logic combiner 114 receives a signal. Chart 640 shows a temporal evolution of said signal. A characteristic time of the RC circuit 510 is noted $\tau_2$. In this illustrative example, $\tau_2$ is about 7 ms. It can be said that the RC circuit 510 thus delays an establishment of the output of the gate 512.

In this example, a failure of one of the fuses 210 occurs at $t=t_2$, as shown on chart 630 when the "$\overline{\text{Fuses}}$" signal is down to zero, which in turn causes the srvOk signal to fall to zero at $t=t_2$. In response, the monitoring circuit 100 actuates the switching mechanism 115 to disconnect the server 150 from the power source 10. As shown on chart 660, the voltage at the power inputs 120 of the monitoring circuit 100 is thus zero at $t=t_3$ shortly after $t_2$.

Chart 620 shows a temporal evolution of the voltage of the Clock Pulse (CP) input of the latch 514, showing a clock rising edge at $t=t_3$ to store the detection state to indicate that the srvOk in is the failure state.

Figure 7:
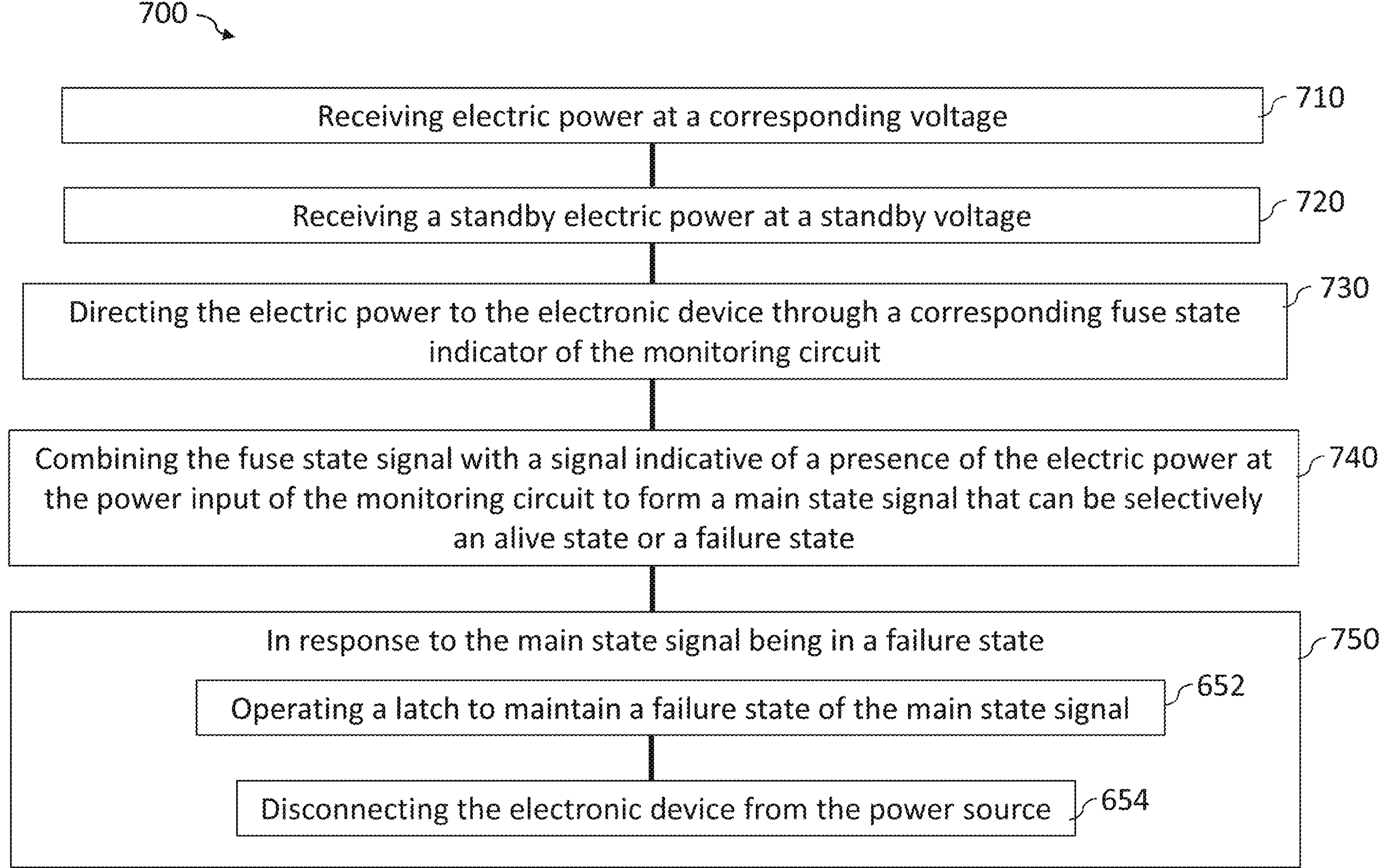
FIG. 7 illustrates a flow diagram showing operations of a method for providing electric power to an electronic device in accordance with non-limiting implementations of the present technology.

FIG. 7 is a flow diagram of a method 700 for providing electric power to an electronic device such as the server 150 according to some examples of the present technology. In one or more aspects, the method 700 or one or more steps thereof may be performed by a processor or a computer system, in the present example by the local controller 110. The method 700 or one or more steps thereof may be embodied in computer-executable instructions that are stored in a computer-readable medium, such as a non-transitory mass storage device, loaded into memory and executed by a CPU. Some steps or portions of steps in the flow diagram may be omitted or changed in order.

The method 700 starts with receiving, at operation 710, from a power source and at a monitoring circuit electrically connected to the electronic device, electric power at a corresponding voltage, the electric power being received at a corresponding power input of the monitoring circuit. For example and without limitations, the electronic device may be a server of a datacenter and the power source may be electrically connected a power distribution unit for transmitting the electric power to the monitoring circuit.

The method 700 continues with receiving, at operation 720, at a standby power input of the monitoring circuit, a first standby electric power at a first standby voltage. The first standby voltage may be for example $12V_{sb}$.

The method 700 continues with directing, at operation 730, by the monitoring circuit, the electric power to the electronic device through a corresponding fuse state indicator of the monitoring circuit. In use, the fuse state indicator selectively connects a corresponding power input to the electronic device and relies on the first standby electric power to operate. The fuse state indicator generates a fuse state signal indicative of a state thereof that can be selectively an alive state or a failure state.

In some implementations, the method 700 may further include converting, subsequent to receiving the first standby electric power, by the monitoring circuit, the first standby electric power into a second standby electric power. For example, the fuse state indicator may rely on a $3.3V_{sb}$ generated from a voltage conversion of the $12V_{sb}$.

The method 700 continues with combining, at operation 740, by a logic combiner of the monitoring circuit such as the logic combiner 114, the fuse state signal with a signal indicative of a presence of the electric power at the power input of the monitoring circuit to form a main state signal that can be selectively an alive state or a failure state.

In some implementations, the logic combiner is a first logic combiner, the electric power is a plurality of electric powers and each electric power being received at a corresponding power input of the monitoring circuit. The monitoring circuit may direct the plurality of electric powers to the electronic device through a plurality of corresponding fuse state indicators of the monitoring circuit, each fuse state indicator selectively connecting a corresponding one of the plurality of power inputs to the electronic device and relying on the first standby electric power to operate, each fuse assembly being configured to generate a corresponding fuse state signal.

In these implementations, the method 700 further includes combining, by a second logic combiner of the monitoring circuit such as the logic combiner 112, the status signals of the plurality of fuse state indicators to form a combined fuse state signal, the first logic combiner being configured to combine the combined fuse state signal with the plurality of electric powers to obtain the main state signal.

In these implementations, the first logic combiner has a first characteristic time during which a main state of the electronic device is set to an alive state upon establishment of the electric connection between the power source and the electronic device. The second logic combiner has a second characteristic time during which the status of each fuse state indicator is set to an alive state upon establishment of the electric connection between the power source and the electronic device, the second characteristic time being greater than the first characteristic time. For example, the second characteristic time may be between 5 and 15 times greater than the first characteristic time.

The method 700 continues with assessing, at operation 750, whether the main state signal is in a failure state. In response to the main state signal being in a failure state, the method 700 includes operating, at sub-operation 752, a latch to maintain a failure state of the main state signal, and disconnecting, at sub-operation 754, the electronic device from the power source. For example, the latch may be a D-type latch. Other types of latch such as S-R latch, JK latch or any other suitable latch are contemplated alternative implementations.

While the above-described implementations have been described and shown with reference to particular steps performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

Figure 8:
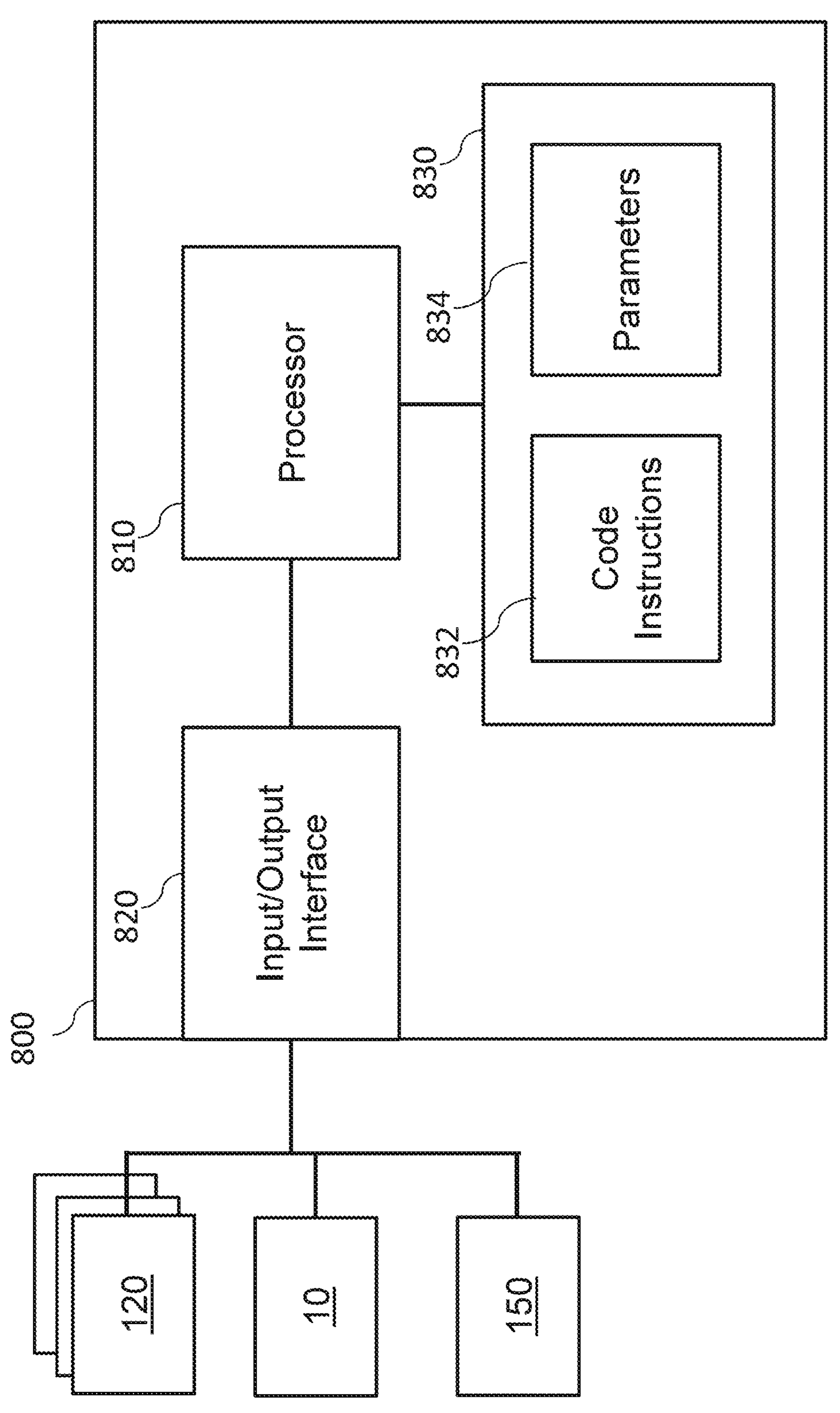
FIG. 8 is a block diagram of a controller in accordance with non-limiting implementations of the present technology.

As an example, FIG. 8 is a schematic block diagram of the local controller 110 of the monitoring circuit 100 according to an example of the present technology. The local controller 110 includes a processor or a plurality of cooperating processors (represented as a processor 810 for simplicity), a memory device or a plurality of memory devices (represented as a memory device 830 for simplicity), and an input/output interface 820 allowing the local controller 110 to communicate with other components of the monitoring circuit 100 and/or other components in communication with the monitoring circuit 100 such as the fuse state indicators 120, the power source 10 and the server 150. The processor 810 is operatively connected to the memory device 830 and to the input/output interface 820. The memory device 830 includes a storage for storing parameters 834. The memory device 830 may comprise a non-transitory computer-readable medium for storing code instructions 832 that are executable by the processor 810 to allow the local controller 110 to perform the various tasks allocated to the local controller 110 in the method 700.

The local controller 110 is operatively connected, via the input/output interface 920, to the fuse state indicators 120, the power source 10 and the server 150. The local controller 110 executes the code instructions 832 stored in the memory device 830 to implement the various above-described functions that may be present in a particular example. FIG. 8 as illustrated represents a non-limiting example in which the local controller 110 orchestrates operations of the monitoring circuit 100. This particular example is not meant to limit the present disclosure and is provided for illustration purposes.

It should be noted that, in this implementation, the local controller 110 may be implemented directly on the server 150.

It is to be understood that the operations and functionality of the described monitoring circuit 100, its constituent components, and associated processes may be achieved by any one or more of hardware-based, software-based, and firmware-based elements. Such operational alternatives do not, in any way, limit the scope of the present disclosure.

It should be expressly understood that not all technical effects mentioned herein need to be enjoyed in each and every example of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method for providing electric power to an electronic device, the method comprising:

receiving, from a power source and at a monitoring circuit electrically connected to the electronic device, electric power at a corresponding voltage, the electric power being received at a corresponding power input of the monitoring circuit;

receiving, at a standby power input of the monitoring circuit, a first standby electric power at a first standby voltage;

directing, by the monitoring circuit, the electric power to the electronic device through a corresponding fuse state indicator of the monitoring circuit, the fuse state indicator selectively connecting a corresponding power input to the electronic device and relying on the first standby electric power to operate, the fuse state indicator being configured to generate a fuse state signal indicative of a state thereof that can be selectively an alive state or a failure state;

combining, by a logic combiner of the monitoring circuit, the fuse state signal with a signal indicative of a presence of the electric power at the power input of the monitoring circuit to form a main state signal that can be selectively an alive state or a failure state; and in response to the main state signal being in a failure state, disconnecting the electronic device from the power source.

2. The method of claim 1, wherein the logic combiner is a first logic combiner, the electric power is a plurality of electric powers, each electric power being received at a corresponding power input of the monitoring circuit, and directing the electric power to the electronic device through a corresponding fuse state indicator of the monitoring circuit comprises:

directing, by the monitoring circuit, the plurality of electric powers to the electronic device through a plurality of corresponding fuse state indicators of the monitoring circuit, each fuse state indicator selectively connecting a corresponding one of the plurality of power inputs to the electronic device and relying on the first standby electric power to operate, each fuse assembly being configured to generate a corresponding fuse state signal, the method further comprising, prior to combining the fuse state signal with the electric power:

combining, by a second logic combiner of the monitoring circuit, the fuse state signals of the plurality of fuse state indicators to form a combined fuse state signal, the first logic combiner being configured to combine the combined fuse state signal with the plurality of electric powers to obtain the main state signal.

3. The method of claim 2, wherein:

the first logic combiner has a first characteristic time during which a main state of the electronic device is set to an alive state upon establishment of an electric connection between the power source and the electronic device, and the second logic combiner has a second characteristic time during which the fuse state signal of each fuse state indicator is set to an alive state upon establishment of the electric connection between the power source and the electronic device, the second characteristic time being greater than the first characteristic time.

4. The method of claim 3, wherein the second characteristic time is between 5 and 15 times greater than the first characteristic time.

5. The method of claim 1, wherein:

the electronic device is a server of a datacenter, and the power source is electrically connected to a power distribution unit for transmitting the electric power to the monitoring circuit.

6. The method of claim 1, wherein the first standby voltage is 12 Vsb.

7. The method of claim 1, further comprising, subsequent to receiving the first standby electric power, converting, by a converting module of the monitoring circuit, the first standby electric power into a second standby electric power.

8. The method of claim 1, further comprising, in response to the main state signal being in a failure state, operating a latch to maintain a failure state of the main state signal.

9. A system for providing electric power to an electronic device, the system comprising:

a power input configured to receive an electric power at a corresponding voltage from a power source;

a standby power input configured to receive a first standby electric power at a first standby voltage from the power source;

a fuse state indicator configured to receive a corresponding electric power from a corresponding power input and output the electric power to the electronic device, the fuse state indicator relying on the first standby electric power to operate, the fuse state indicator being configured to generate a fuse state signal indicative of a state thereof that can be selectively an alive state or a failure state;

a logic combiner configured to combine the fuse state signal with a signal indicative of a presence of the electric power at the power input, the logic combiner being configured to generate a main state signal that can be selectively an alive state or a failure state; and a controller configured to, in response to the main state signal being in a failure state, cause a disconnection of the electronic device from the power source.

10. The system of claim 9, wherein the logic combiner is a first logic combiner, and the system further comprises:

a plurality of power inputs, each power input being configured to receive a corresponding electric power at a corresponding voltage from the power source;

a plurality of fuse state indicator, each fuse state indicator being configured to receive the corresponding electric power from a corresponding one of the power inputs and output the electric power to the electronic device; and a second logic combiner configured to combine the fuse state signals of the plurality of fuse state indicators to form a combined fuse state signal, the first logic combiner being configured to combine the combined fuse state signal with the plurality of electric powers to obtain the main state signal.

11. The system of claim 10, wherein:

the first logic combiner has a first characteristic time during which a main state of the electronic device is set to an alive state upon establishment of an electric connection between the power source and the electronic device, and the second logic combiner has a second characteristic time during which the fuse state signal of each fuse state indicator is set to an alive state upon establishment of the electric connection between the power source and the electronic device, the second characteristic time being greater than the first characteristic time.

12. The system of claim 9, wherein the first standby voltage is 12 Vsb.

13. The system of claim 9, further comprising, subsequent to receiving the first standby electric power, converting, by a converting module, the first standby electric power into a second standby electric power.

14. The system of claim 9, wherein the controller is further configured to, in response to the main state signal being in a failure state, cause a latch to maintain a failure state of the main state signal.

15. The system of claim 9, wherein:

the electronic device is a server of a datacenter, and the power source is electrically connected to a power distribution unit for transmitting the electric powers to the power input.

* * * * *